(12) United States Patent
Draznin et al.

(10) Patent No.: US 11,165,873 B2
(45) Date of Patent: Nov. 2, 2021

(54) ENDPOINT BASED NETWORK SERVICE SCALING

(71) Applicant: Verizon Patent and Licensing Inc., Arlington, VA (US)

(72) Inventors: Sagiv Draznin, Walnut Creek, CA (US); Patricia R. Chang, San Ramon, CA (US); Maria G. Lam, Oakland, CA (US); Priscilla Lau, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 68 days.

(21) Appl. No.: 16/218,898

(22) Filed: Dec. 13, 2018

(65) Prior Publication Data

US 2020/0195732 A1 Jun. 18, 2020

(51) Int. Cl.
*H04L 29/08* (2006.01)
*H04M 15/00* (2006.01)
*H04W 8/04* (2009.01)
*H04W 8/08* (2009.01)
*H04B 7/0413* (2017.01)

(52) U.S. Cl.
CPC ............ *H04L 67/16* (2013.01); *H04L 67/303* (2013.01); *H04M 15/66* (2013.01); *H04W 8/04* (2013.01); *H04W 8/08* (2013.01); *H04B 7/0413* (2013.01)

(58) Field of Classification Search
CPC .................... H04M 1/7253; H04N 21/4788
See application file for complete search history.

(56) References Cited

U.S. PATENT DOCUMENTS

| | | | | |
|---|---|---|---|---|
| 2006/0233191 | A1* | 10/2006 | Pirzada | H04W 12/06 370/463 |
| 2012/0066722 | A1* | 3/2012 | Cheung | H04M 1/7253 725/62 |
| 2019/0174185 | A1* | 6/2019 | Leduby | H04N 21/4436 |

* cited by examiner

*Primary Examiner* — Philip J Chea
*Assistant Examiner* — Mohammed Ahmed

(57) ABSTRACT

A method for endpoint device service scaling may include identifying, at a repository device, an endpoint device that is attached to a network; and determining, at the repository device, whether the endpoint device is connected to an external display. The method may include determining, at the repository device, profile data associated with the external display in response to determining that the endpoint device is connected to an external display; and identifying, at the repository device, a connection that provides network access to the endpoint device. The method may further include specifying a service based on at least one of the profile data or the identified connection.

20 Claims, 8 Drawing Sheets

REPOSITORY TABLE 600

| ENDPOINT DEVICE IDENTIFIER 610 | EPD PROFILE 620 | SIZE 630 | DISPLAY RESOLUTION 640 | DISPLAY INTERFACE 650 | WINDOW MODE 660 | ASPECT MODE 670 |
|---|---|---|---|---|---|---|
| 03-3285839-968753-04 | Dynamic | 60; 52 x 30 | 1080 | WiFi | SCREEN | LANDSCAPE |
| 36-6462839-738753-14 | Dynamic | 50; 44 x 24 | 720 | Bluetooth | WINDOW | PORTRAIT |
| 18-6235874-038183-09 | Static | 80; 70 x 39 | 4K | HDMI | SCREEN | LANDSCAPE |

Fig. 6

ENDPOINT BASED NETWORK SERVICE SCALING

BACKGROUND

Long Term Evolution (LTE) is an existing mobile telecommunications standard for wireless communication. LTE networks include $4^{th}$ Generation (4G) wireless networks which are widely deployed throughout the world. LTE increased the capacity and speed from prior generations of wireless networks and simplified the network architecture. Next Generation wireless networks, such as $5^{th}$ Generation (5G) networks, are being deployed as the next evolution of wireless networks. Next Generation wireless networks are designed to increase data transfer rates, increase spectral efficiency, improve coverage, improve capacity, and reduce latency. Given the increases in data rates, users are more likely to view video content on wireless devices that may interface with external displays. When establishing a data service for displaying content, conventional approaches do not consider the external displays that may be used to display content.

BRIEF DESCRIPTION OF THE DRAWINGS

FIG. 6 is a diagram showing a table representing the storage of profile data for an endpoint device associated with an external display;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to wireless communications systems which may efficiently adjust (i.e., scale) the service to an endpoint device depending upon whether the endpoint is connected to an external display. In conventional networks, when a user is viewing video content on an endpoint device including a small display (e.g., smartphone), the user may be unable to discern the quality difference between low and high speed data service (e.g., where high speed service may have high bandwidth and/or low latency) upon viewing the received video content. However, when the endpoint device is connected to an external display, such as, for example, a large screen flat-panel television, the user may be able to tell the difference between receiving data commensurate with various resolutions. An endpoint device may include, for example, customer premises equipment (CPE) such as a set top box and/or a home entertainment hub. Alternatively, an endpoint device may include a user equipment (UE) device such as a smart phone, a tablet device, a wearable computer device, a laptop, etc.

Accordingly, in order to promote efficient network operation while maintaining high user satisfaction, embodiments herein may detect the presence of an external display connected to an endpoint device, and then adjust quality of service to the endpoint device depending upon the type of external display detected. Embodiments may also adjust the service to the endpoint device depending upon the type of interconnection between the endpoint device and the external display (e.g., WiFi, Bluetooth, any type of wired point to point interface, such as High Definition Multimedia Interface (HDMI), etc.) and/or type of wireless connection (e.g., LTE or 5G) used by the endpoint device to access the network.

Figure 1:
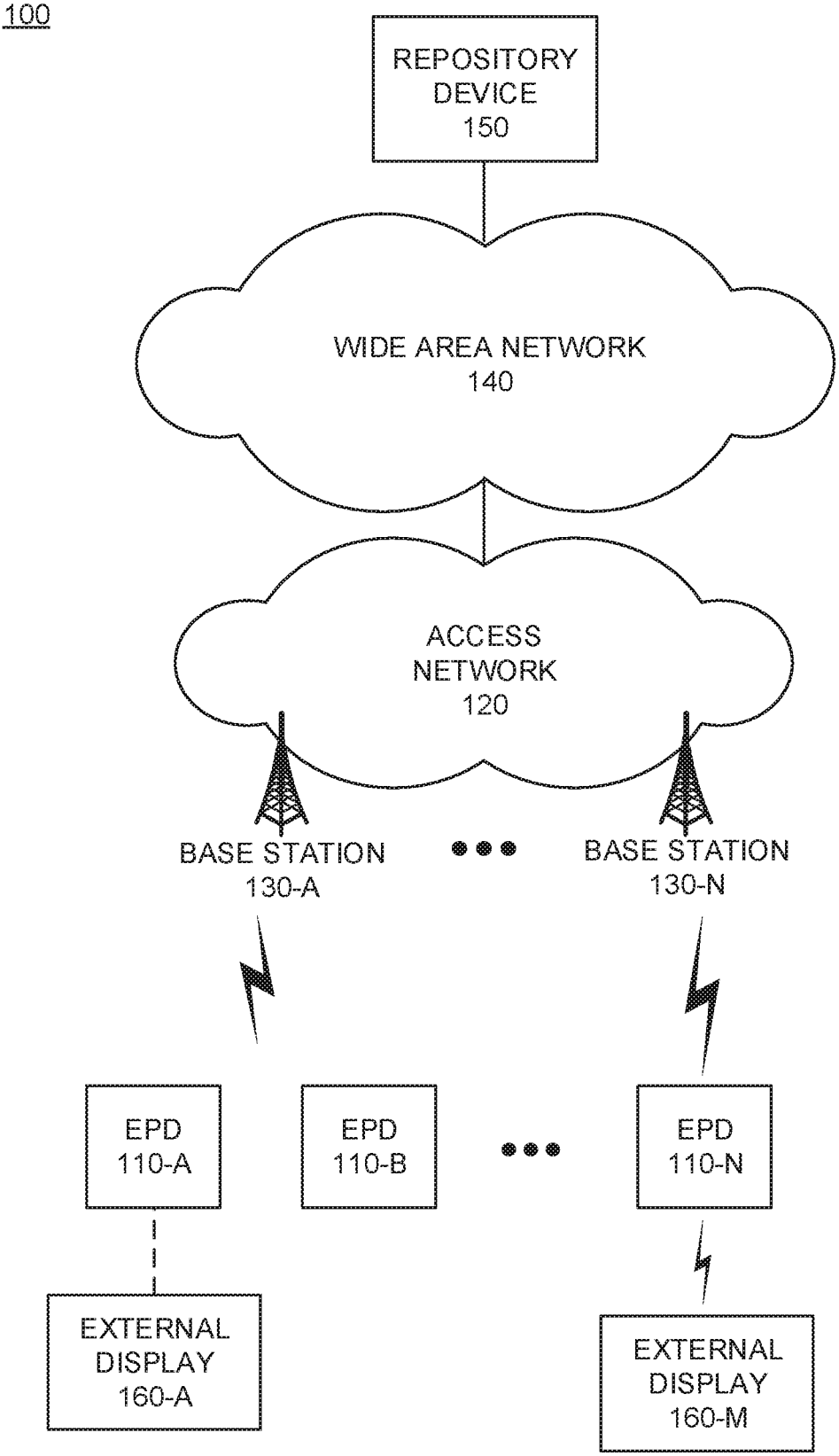
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include endpoint devices (EPDs) 110-A to 110-N (referred to herein collectively as "EPDs 110" and individually as "EPD 110"), an access network 120, a wide area network (WAN) 140, a repository device 150, and external displays 160-A to 160-M (referred to herein collectively as "external displays 160" and individually as "external display 160").

EPD 110 may include any device with long-range (e.g., cellular or mobile wireless network) wireless communication functionality. For example, EPD 110 may be a user equipment (UE) device that may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player e.g., Apple TV™, Google Chromecast™, Amazon Fire TV™, etc.); a smart television; a portable gaming system; a global positioning system (GPS) device; a home appliance device; a home monitoring device; and/or any other type of computer device with wireless communication capabilities and a user interface. EPD 110 may include any type of customer premises equipment (CPE) such as a set top box, a wireless hotspot (e.g. an LTE or 5G wireless hotspot), a femto-cell, etc. EPD 110 may include capabilities for voice communication, mobile broadband services (e.g., video streaming, real-time gaming, premium Internet access etc.), best effort data traffic, and/or other types of applications.

In some implementations, EPD 110 may communicate using machine-to-machine (M2M) communication, such as machine-type communication (MTC), a type of M2M communication standardized by the $3^{rd}$ Generation Partnership Project (3GPP), and/or another type of M2M communication. For example, EPD 110 may include a health monitoring device, an asset tracking device (e.g., a system monitoring the geographic location of a fleet of vehicles, etc.), a device controlling an electronic sign (e.g., an electronic billboard, etc.), a device controlling a manufacturing system, a device controlling a security system, and/or another type of electronic device.

External display 160 may be any type of display, including light emitting diode display (LED), and organic LED (OLED) display, a liquid crystal display (LCD), a cathode ray tribe (CRT), etc. External display 160 may communicate with EPD 110 and receive video data and/or commands over a wired (e.g., HDMI, Display Port, Thunderbolt, universal serial bus (USB) C, VGA, etc.) (e.g., as shown as external display 160-A, where the connection is represented by a dashed line because the presence of external display 160-A may be optional and/or removable) and/or a wireless connection (e.g., Wi-Fi, Bluetooth™, wireless USB, etc.), shown as external display 160-M. External display 160 may report parameters to EPD 110 for profiling the display, which may be, for example, performed by the operating system of EPD 110. Additionally, external display 160 may use near field communication (NFC), Bluetooth, ZigBee, etc. to perform handshaking with EPDs 110 and/or repository device 150.

Access network 120 may provide access to WAN 140 for EPDs 110. Access network 120 may enable EPD 110 to connect to WAN 140 for mobile telephone service, Short Message Service (SMS) message service, Multimedia Message Service (MMS) message service, Internet access, cloud computing, and/or other types of data services.

Access network 120 may establish or otherwise facilitate a packet data network connection between EPD 110 and WAN 140 via one or more Access Point Names (APNs), where APNs may designate network resources within WAN 140. For example, access network 120 may establish an Internet Protocol (IP) connection between EPD 110 and WAN 140. Furthermore, access network 120 may enable EPD 110 to communicate with repository device 150, an application server, and/or another type of device, located in WAN 140.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE network).

Furthermore, access network 120 may include an LTE Advanced (LTE-A) network and/or a 5G network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of EPDs 110. For example, base station 130-A may service EPDs 110-A and 110-B, and base station 130-N may service EPD 110-N. Base station 130 may include a 5G base station (e.g., a gNodeB) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k EPDs 110 and may simultaneously generate up to k antenna beams. A particular antenna beam may service multiple EPDs 110. In some implementations, base station 130 may also include a 4G base station (e.g., an eNodeB).

WAN 140 may include any type of wide area network, a metropolitan area network (MAN), an optical network, a video network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or EPD 110. WAN 140 may allow the delivery of Internet Protocol (IP) services to EPD 110, and may interface with other external networks. WAN 140 may include one or more server devices and/or network devices, or other types of computation or communication devices. In some implementations, WAN 140 may include an IP Multimedia Sub-system (IMS) network (not shown in FIG. 1). An IMS network may include a network for delivering IP multimedia services and may provide media flows between EPD 110 and external IP networks or external circuit-switched networks (not shown in FIG. 1).

Repository device 150 may include one or more devices, such as computer devices, databases, and/or server devices, which may detect a connection of an external display to an EPD 110 when EPD 110 attaches or is otherwise connected to access network 120. Repository device 150 may then determine data associated with profiling it external display (referred to herein as "profile data") and specify (i.e., recommend) a data service (e.g., a Quality of Service (QoS) level) to access network 120. Access network 120 may check the resource availability for designating an appropriate service for EPD 110 and the detected external display. For example, if the detected external display is a large, high resolution display, repository device 150 will suggest a service associated with a high bandwidth. Alternatively, if the detected external display is a small, low resolution display, repository device 150 will suggest a service associated with a low bandwidth. Repository device 150 may also consider whether EPD 110 is dynamic (e.g., a user equipment device) or static (e.g., a set-top box) and/or the wireless connection used by EPD 110 to access the network (e.g., LTE, 5G, etc.). Repository device 150 may further consider how the external display is being used, for example, whether content is being displayed in landscape or portrait mode, whether the entire screen of the display is being used to show content, or only a portion thereof. For example, content may be shown within a window covering only a portion of the display. Repository device 150 may collect profile information regarding the external display 160 connected to EPD 110, and a store the collected profile data in a repository table (e.g., a file and/or records in a database) for future use.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
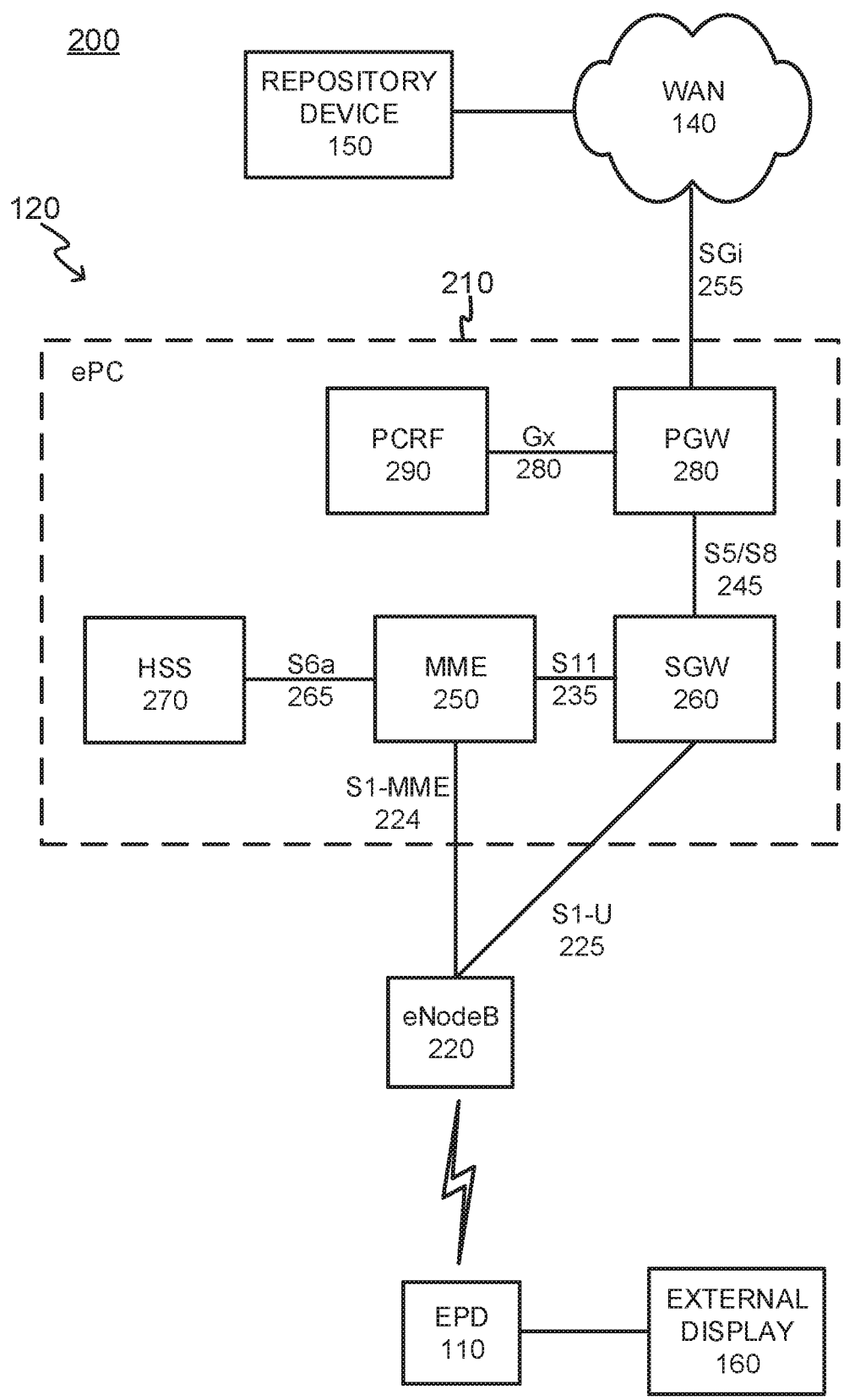
FIG. 2 is a block diagram of an exemplary system including an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). EPD 110 and eNodeB 220 may exchange data over a radio access technology (RAT) based on LTE air channel interface protocols. EPD 110 may interface with external display 160 over a wireless or wired interconnection. In the embodiment shown in FIG. 2, ePC 210 may work in conjunction with an evolved Universal Mobile Telecommunications System (UMTS) Terrestrial Network (eUTRAN) that includes at least one eNodeB 220. Networking system 200 may further include an Internet Protocol (IP) network, which may be embodied separately or included in a backhaul network (not shown) and/or WAN 140. A shown in FIG. 2, repository device 150 may be connected to WAN 140 over a wired or wireless connection, using, for example, transmission control protocol/internet protocol (TCP/IP).

EPC 210 may include one or more devices that are physical and/or logical entities interconnected via standardized interfaces. EPC 210 provides wireless packet-switched services and wireless IP connectivity to user devices to provide, for example, data, voice, and/or multimedia services. EPC 210 may further include a mobility management entity (MME) 250, a serving gateway (SGW) 260, a home subscriber server (HSS) 270, a packet data network gateway (PGW) 280, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components including functionality that allows EPD 110 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 225 may be implemented, for example, using a tunneling protocol. S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for EPD 110, may activate and deactivate bearers for EPD 110, and may authenticate a user of EPD 110 to provide normal coverage service for operating in normal UE device mode. MME 250 may also select a particular SGW 260 for a particular EPD 110. MME 250 may interface with other MMEs (not shown) in ePC 210 and may send and receive information associated with UEs 110, which may allow one MME 250 to take over control plane processing of UEs serviced by another MME 250, if the other MME becomes unavailable.

SGW 260 may provide an access point to and from EPD 110, may handle forwarding of data packets for EPD 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140, which may provide various services (e.g., over the top voice services) to EPD 110. A particular EPD 110, while connected to a single SGW 260, may be connected to multiple PGWs 280, one for each packet network with which EPD 110 communicates.

Alternatively, EPD 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular EPD 110. S11 interface 235 may be activated when MME 250 needs to communicate with SGW 260, such as when the particular EPD 110 attaches to ePC 210, when bearers need to be added or modified for an existing session for the particular EPD 110, when a connection to a new PGW 280 needs to be created, or during a handover procedure (e.g., when the particular EPD 110 needs to switch to a different SGW 260).

HSS 270 may store information associated with EPD 110 and/or information associated with users of EPD 110. For example, HSS 270 may store user profiles that include registration, authentication, and access authorization information. MME 250 may communicate with HSS 270 through an S6a interface 265. S6a interface 265 may be implemented, for example, using a Diameter protocol.

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 280. Gx interface 280 may be implemented, for example, using a Diameter protocol.

Repository device 150 may be any network device (e.g., computer device, server device, Internet of Things (IoT) device, etc.), which may detect a connection of external display 160 to an EPD 110 over WAN 140 when EPD 110 attaches or is otherwise connected to access network 120. Repository device 150 may then determine profile data and specify or suggest a service to PCRF 290 via WAN 140. The service request may be in the form of lower level data requirements (such as, for example, bandwidth, latency, etc.), and/or be in the form of a specific QoS level consistent with LTE standards. For example, repository device 150 may use a QoS class identifier (QCI) as the criteria for communicating the level of service when making a request to ePC 210. PCRF 290 may then determine what network resources are available, and inform repository device 150 and/or the EPD 110 of the level of service granted. Repository device 150 may collect profile information regarding the external display connected to EPD 110 via WAN 140, and a store the collected profile data in a repository table (e.g., a file and/or records in a database) for future use.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
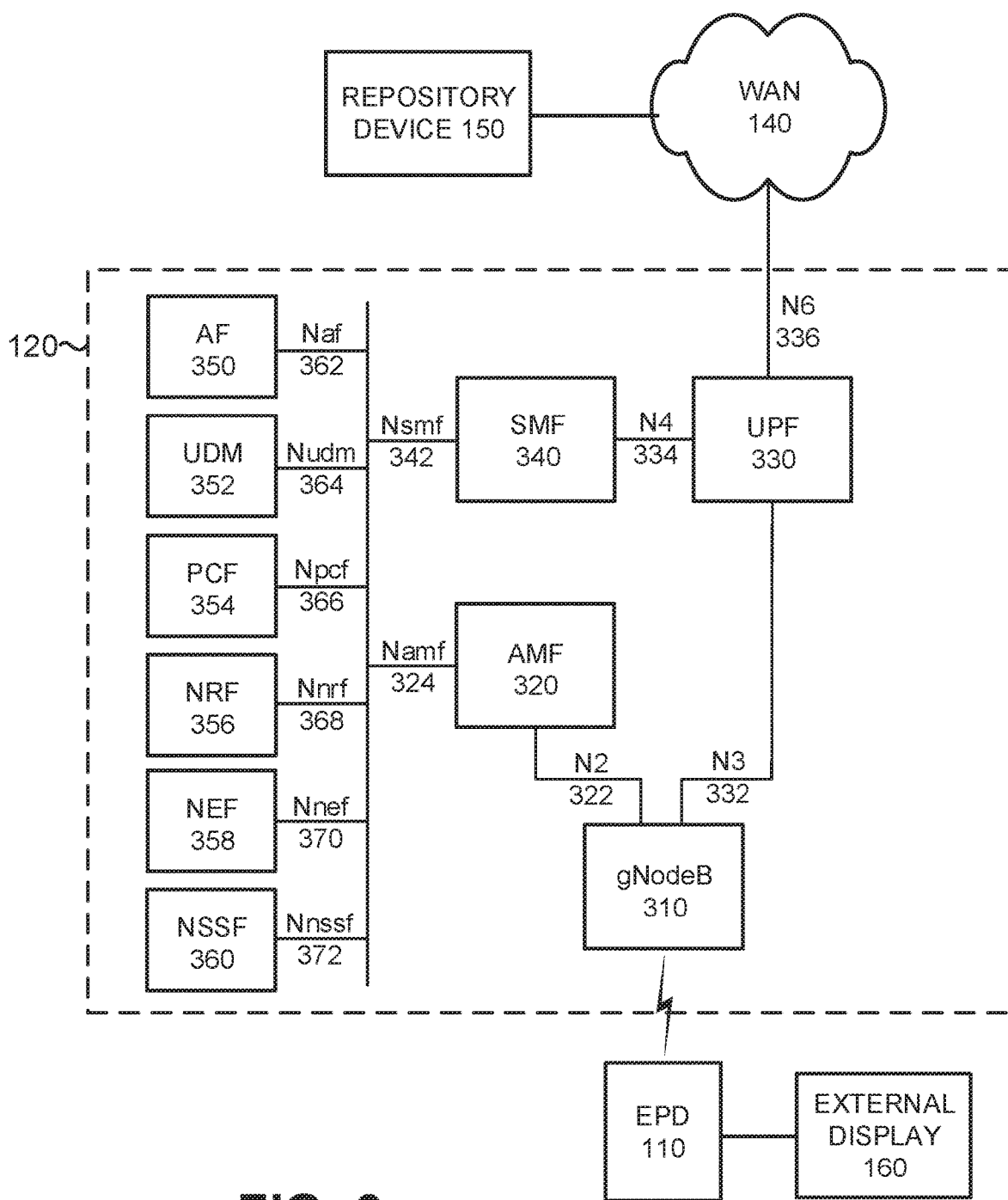
FIG. 3 is a block diagram of an exemplary system including an access network based on a 5G standard.

FIG. 3 is a block diagram of an exemplary system 300 including an access network 120 based on a 5G standard. As shown in FIG. 3, system 300 may include EPD 110, access network 120, WAN 140, and repository device 150.

Access network 120 may include a gNodeB 310 (corresponding to base station 130), an Access and Mobility Function (AMF) 320, a User Plane Function (UPF) 330, a Session Management Function (SMF) 340, an Application Function (AF) 350, Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable EPD 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMP 320 using an N2 interface 322 and communicate with UPF 330 using an N3 interface 332.

AMF 320 may perform registration management, connection management, reachability management, mobility management, lawful intercepts, Short Message Service (SMS) transport between EPD 110 and an SMS function (not shown in FIG. 3), session management messages transport between EPD 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via an Namf interface 324.

UPF 330 may maintain an anchor point for intra/inter-RAT mobility, maintain an external Packet Data Unit (PDU) point of interconnection to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, terminate session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for EPD 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via an Nudm interface 364.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities and events to other NFs, including third party NFs, AFs, edge computing NFs, and/or other types of NFs. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular EPD 110, determine network slice selection assistance information (NSSAI), determine a particular AMF 320 to serve a particular EPD 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Repository device 150 may be any network device (e.g., computer device, server device, IoT device, etc.), which may detect a connection of an external display to an EPD 110 over WAN 140 when EPD 110 attaches or is otherwise connected to access network 120. Repository device 150 may then determine profile data and specify, recommend, or suggest a service to PCF 354 via WAN 140. The service request may be in the form of lower level data requirements (such as, for example, bandwidth, latency, etc.), and/or be in the form of a specific QoS level consistent with 5G standards. For example, repository device 150 may use a QFI as the criteria for communicating the level of service when making a request to access network 120. PCF 354 may then determine what network resources are available, and inform the repository device and/or the EPD 110 of the level of service granted. Repository device 150 may collect profile information regarding the external display 160 connected to EPD 110 via WAN 140, and a store the collected profile data in a repository table (e.g., a file and/or records in a database) for future use.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
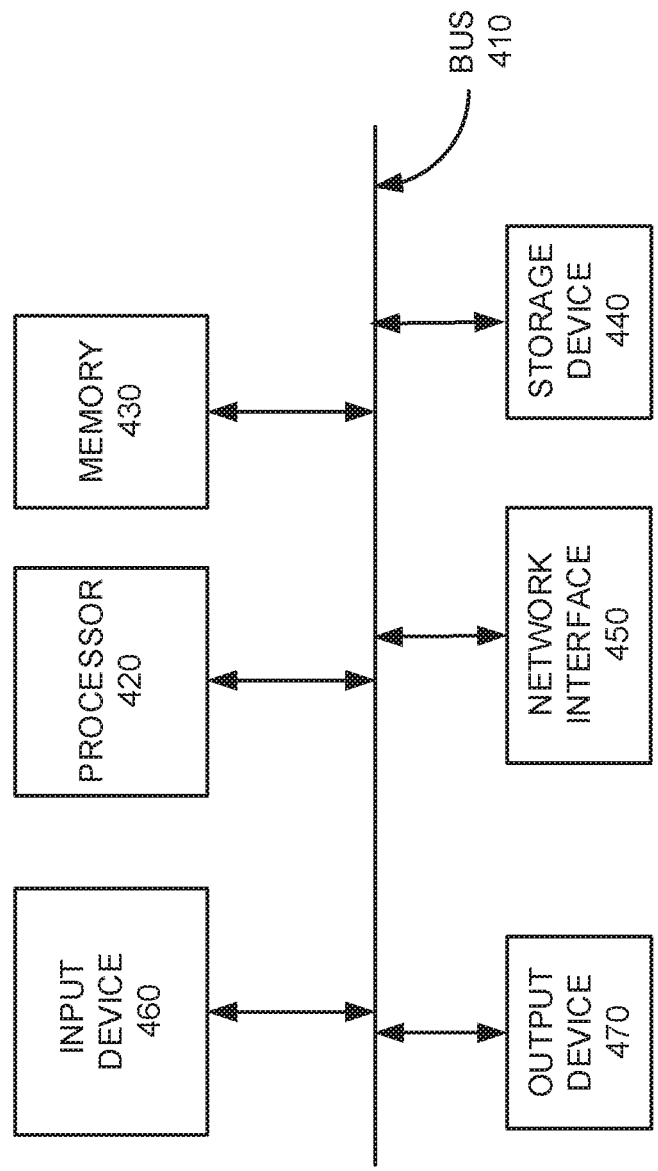
FIG. 4 is a block diagram showing exemplary components of a repository device according to an embodiment.

FIG. 4 is a block diagram which may be representative of any of the network components shown in FIG. 1, including showing exemplary components of a repository device 150 according to an embodiment. As shown in FIG. 1, repository device 150 may interface with access network 120 via WAN 140. However, in other embodiments, repository device 150 may reside in access network 120. Repository device 150 may include a bus 410, a processor 420, a memory 430, a storage device 440, a network interface 450, input device 460, and an output device 470.

Bus 410 includes a path that permits communication among the components of repository device 150. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with EPDs 110.

Network interface 450 may include a transceiver that enables repository device 150 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas or antenna arrays for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

Input device 460 may include one or more mechanisms that permit an operator to input information profiler device 180, such as, for example, a keypad or a keyboard, a microphone, voice recognition, components for a touchscreen, and/or biometric mechanisms, etc. In some embodiments, no input device may be included in repository device 180 because it may be controlled remotely by a technician over WAN 140 and/or through access network 120.

Output device 470 may output information to a technician. Output device 470 may include a display (such as a liquid crystal display (LCD)), a printer, a speaker, and/or another type of output device. In some embodiments, repository device 150 may be controlled remotely by a technician and may not include output device 370.

As described below, repository device 150 may perform certain operations relating to facilitating endpoint-based service scaling. Repository device 150 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flow charts shown in FIGS. 7 and 8.

Although FIG. 4 shows exemplary components of repository device 150, in other implementations, repository device 150 may include fewer components, different components, additional components, or differently arranged components than depicted in FIG. 4.

Figure 5:
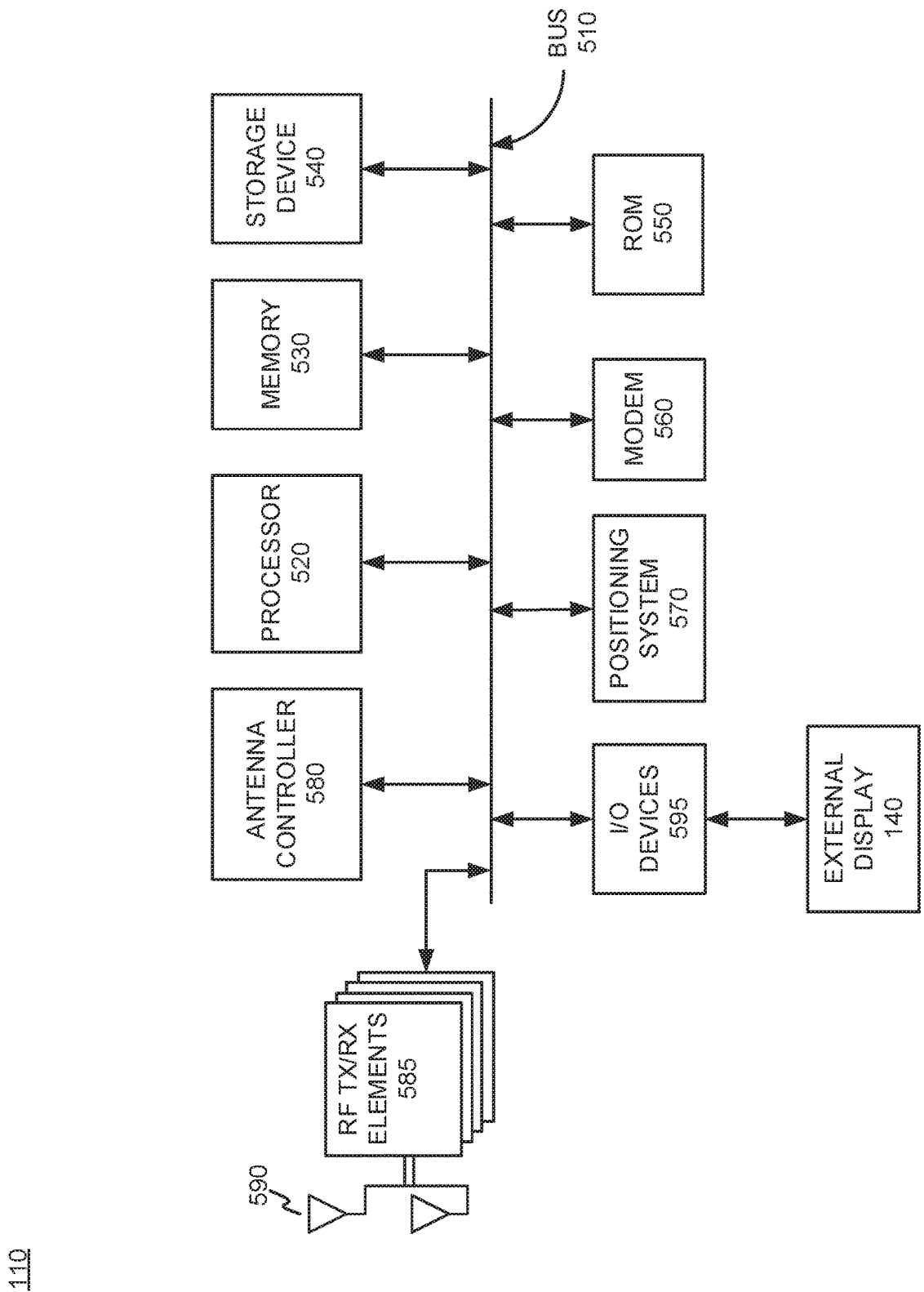
FIG. 5 is a is a block diagram showing exemplary components of an endpoint device according to an embodiment.

FIG. 5 is a block diagram showing exemplary components of an embodiment of EPD 110. EPD 110 may be any device with wireless communication functionality that may exchange data with access network 120. As noted in the description of FIG. 1, EPD 110 may be any type of UE device such as a mobile device, any type of CPE such as a set top box, a wireless hotspot (e.g. an LTE or 5G wireless hotspot), a femto-cell, etc. EPD 110 may include capabilities for voice communication, mobile broadband services (e.g., video streaming, real-time gaming, premium Internet access etc.), best effort data traffic, and/or other types of applications.

EPD 110 may include bus 510, processor 520, memory 530, storage device 540, ROM 550, modem 560, positioning system 570, antenna controller 580, radio frequency transmit/receive (RF TX/RX) elements 585, antenna array 590, and input output (I/O) devices 595. In another embodiment, EPD 110 may only have one antenna and a single associated RF TX/RX module, and may not require antenna controller 580. Bus 510 may interconnect each of the components of EPD 110 either directly or indirectly to exchange commands and/or data.

Processor 520 may include a processor, microprocessor, or processing logic that may interpret and execute instructions. Memory 530 may include a random access memory (RAM) or another type of dynamic storage device that may store information and instructions for execution by processor 520. Storage device 540 may include a persistent solid state read/write device, a magnetic, and/or optical recording medium and its corresponding drive. ROM 550 may include a ROM device or another type of static storage device that may store static information and instructions for use by processor 520.

Modem 560 may perform various communications and signal processing operations to allow EPD 110 to efficiently communicate over the network. Modem 560 may perform signal conditioning (e.g., filtering), signal encoding and decoding, signal modulation and demodulation, and/or error correction for data being transferred over the access stratum. Modem 560 may also operate in the non-access stratum and thus facilitate signaling and coordination with network devices in wireless access network to manage the establishment of communication sessions and for maintaining continuous communications.

Positioning system 570 may include a variety of receivers, sensors, and/or processors to provide relative and/or absolute position and orientation data of EPD 110. For example, positioning system 570 may include a satellite navigation system, such as, for example, global positioning system (GPS) component, which may provide position information in relation to a standard reference frame. Position information may include rectangular coordinates in the world geodetic system 1984 (WGS84) frame (in either two or three dimensions), geodic coordinates such as latitude, longitude, and altitude, and/or other suitable positioning data. In another embodiment, positioning system 570 may include an internal measurement unit (IMU) to determine relative displacements based on measured accelerations, and/or gyroscopes to measure angular displacements such as the roll, pitch, and yaw of the EPD 110. Positioning system 570 may further include sensors, such as magnetometers, which may be used to determine orientation in a reference frame, such as, for example, the angular orientations with respect to magnetic and/or true north.

Antenna controller 580 may accept data for transmission from processor 520 and/or modem 560, and perform TX MIMO encoding if required to produce multiple channels of data for a set of the antenna elements in antenna array 590, which may be transmitted over an uplink via wireless channel over RAT. Signals which have been received in a downlink, via a wireless channel over RAT, through antenna array 590 may be decoded using RX MIMO decoding to combine streams into fewer data channels or a single received channel. Antenna controller 580 may further apply beamforming weights (which perform relative phase, frequency, and amplitude modulations between the antenna elements) on the transmit data streams to electronically adjust the transmit antenna pattern. Additionally, antenna controller 580 may apply beamforming weights on the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls. Moreover, when transmitting or receiving in enhanced coverage mode, antenna controller 580 may perform additional processing to improve the reliability and or signal-to-noise ratio of the wireless channel when EPD 110 operates in an environment which presents challenging signal conditions that would significantly degrade wireless channel operating in normal coverage mode.

RF TX/RX elements 585 may include discrete RF elements to amplify, frequency demodulate (e.g., down convert) analog channels received over antenna array 590 and convert the analog channels to received digital streams using analog to digital converters. The received digital streams may be passed to antenna controller 580 which may further perform RX MIMO processing to combine MIMO streams. RF TX/RX elements 585 may further process transmit digital streams, which may be TX MIMO encoded by antenna controller 580 prior to being converted to analog signals using digital to analog converters. The analog signals may be frequency upconverted and amplified for transmission by RF TX/RX elements 585, and subsequently radiated by antenna array 590.

Antenna array 590 may include at least two antenna elements which have independent channels that may be used for electronic adjustments of both the transmit and receive antenna patterns, and/or also for transmit and/or receive MIMO processing to improve wireless channel reliability and/or throughput.

I/O devices 595 may include one or more mechanisms that permit an operator to input information to EPD 110, such as, for example, a keypad or a keyboard, a microphone, voice recognition and/or biometric mechanisms, etc. I/O devices 595 may also include one or more mechanisms that output information to the operator, including a display, a speaker, etc. I/O devices 595 may further provide an interface to connect external display 160, I/O devices 595 may provide video data to external display 160, and may receive profile data and/or status information from external display 160. The interface between EPD 110 and external display 160 may include a wireless interface (e.g., WiFi, Bluetooth, wireless HDMI, wireless ultra wide band (UWB), etc.). In other embodiments, the interface between EPD 110 and external display 160 may be any wired interface, and can include Thunderbolt, USB C (e.g., USB 3.0, 3.1, etc.), HDMI, display port (DP), digital video interface (DVI), S-Video, video display adaptor (VGA), etc.

EPD 110 may perform certain operations or processes, as may be described in detail below. EPD 110 may perform these operations in response to processor 520 executing software instructions contained in a computer-readable medium, such as memory 530. A computer-readable medium may be defined as a physical or logical memory device. A logical memory device may include memory space within a single physical memory device or spread across multiple physical memory devices. The software instructions may be read into memory 530 from another computer-readable medium, such as storage device 540, or from another device via the network. The software instructions contained in memory 540 may cause processor 520 to perform operations or processes. Alternatively, hardwired circuitry may be used in place of or in combination with software instructions to implement processes consistent with the principles of the embodiments. Thus, exemplary implementations are not limited to any specific combination of hardware circuitry and software.

The configuration of components of EPD 110 illustrated in FIG. 5 is for illustrative purposes only. It should be understood that other configurations may be implemented. Therefore, EPD 110 may include additional, fewer and/or different components than those depicted in FIG. 5.

FIG. 6 is a diagram showing a repository table 600 representing the storage of exemplary profile data for EPD 110 associated with external display 160. Repository table 600 may be stored by repository device 150 for EPDs 110 in network environment 100. While only one table is shown, repository device may store a plurality of repository tables 600 to store profile data for EPDs 110 across networking environment 100. One or more repository tables 600 may be stored internally, for example, on storage device 440, and/or stored on an external storage system (not shown) which communicates with repository device 150 (e.g., via network interface 450). Repository table 600 may store profile data associating one or more external displays 160 with an identified EPD 110. The profile data may initially be provided by EPD 110 to repository device 150 during, for example, a reporting process as exemplified in flowchart 800 described below with respect to FIG. 8. Reporting process 800 may occur during or after EPD 110 attaches to access network 120, and may occur periodically to record any updates to the state of the EPD 110 (i.e., if external display 160 is disconnected form EPD 110, or interchanged with a different external display 160.

Further referring to FIG. 6, repository table 600 may include a unique endpoint device identifier (EPDI) field 610 that identifies a specific EPD 110. The EPDI may be, for example, an international mobile equipment identity (IMEI) number, an international mobile subscriber number identify (IMSI) number, etc. Using the EPDI, EPD 110 may be associated with profile data that provides information regarding the EPD 110 and/or external display 160. For example, table 600 may include an EPD profile field 620 that includes an EPD profile parameter indicating the type of endpoint device. For example, EPD profile field 620 may include a general descriptor such as "Dynamic" or "Static." A "Dynamic" EPD profile can indicate EPD 110 is dynamic device, such as, for example, a mobile device embodied as a UE device (e.g. LTE, 5G New Radio (NR), etc.). A "Static" EPD profile can indicate that EPD 110 is a static device, such as a non-mobile device that may include, for example, customer premises equipment (CPE). CPE may include a set-top box, a cellular hotspot, a wireless access point, etc. The EPD profile may also indicate specific types of mobile devices and/or internet of things (IoT) device types, such as, for example, a CAT-1 device, a CAT-M1 device, a CAT-NB1 device, etc.

Repository table 600 may also include a parameter "size" field 630 indicating the size of the screen for the external display. In an embodiment, the size of the screen may be indicated as a diagonal measurement (e.g., in inches) and/or as a measurement of the length and width of the screen (e.g., in inches), such as, 60 inches diagonal and 52 inches×30 inches, as illustrated in FIG. 6. Alternatively, the dimensions of the screen size may be given in horizontal and/or vertical pixels, relative terms such as large, high-definition, small, normal resolution/definition etc. In another embodiment, size may indicate a "window size" being used to display content (e.g., video data), which may be a subset of the screen size. The screen size may be indicated as a diagonal measurement (e.g., in inches) and/or as a measurement of the length and width of the screen (e.g., in inches). Alternatively, the dimensions of the screen size may be given as a number of pixels in the horizontal and/or vertical dimension, or a relative dimension, such as a portion of the screen (e.g., ¼ of the screen, half of the screen, etc.). Repository table 600 may also include a "display resolution" field 640 that may indicate the resolution for which content may be displayed (e.g., video resolution). The display resolution may be given in the number of lines of resolution (e.g., 1080, 720, 4K, 5K, 8K, etc.) and may also indicate if the lines of resolution are presented in a progressive or interlaced video format. Repository table 600 may also include a "display interface" field 650 indicating the type of interconnection between EPD 110 and external display 160. The interconnection may include a wireless interconnection, such as, for example, WiFi, Bluetooth, wireless USB, wireless HDMI, etc.). The interconnection may also include a wired connection, such as a point-to-point connection based on Display Port, HDMI USB 3, Thunderbolt, etc. Repository table 600 may further include a window mode field 660 storing a parameter indicating whether content is displayed in a window within the screen (e.g., WINDOW MODE=WINDOW) or if content is displayed within the entire screen (WINDOW MODE=SCREEN). Additionally, repository table 600 may include an aspect mode field 670 storing parameter indicating the aspect mode of the screen, such as, whether content is displayed in a "landscape" orientation or a "portrait" orientation. In some embodiments, repository table 600 may include additional information fields regarding external display 160, such as video codec and/or audio codec compatibility, high dynamic range capability (e.g., Dolby Vision, HDR10, Hybrid Log-Gamma, etc.). Additionally, repository table may include addition information fields regarding EPD 110, such as, for example, fields relating to multiple external displays 160, video processing capability, data storage capacity, power information such as battery level, external power connection, etc.

The structure of repository table 600 illustrated in FIG. 6 is for illustrative purposes only. It should be understood that other configurations may be implemented. Therefore, repository table 600 may include additional, fewer and/or different fields than those depicted in FIG. 6, and may be arranged using different data structures.

Figure 7:
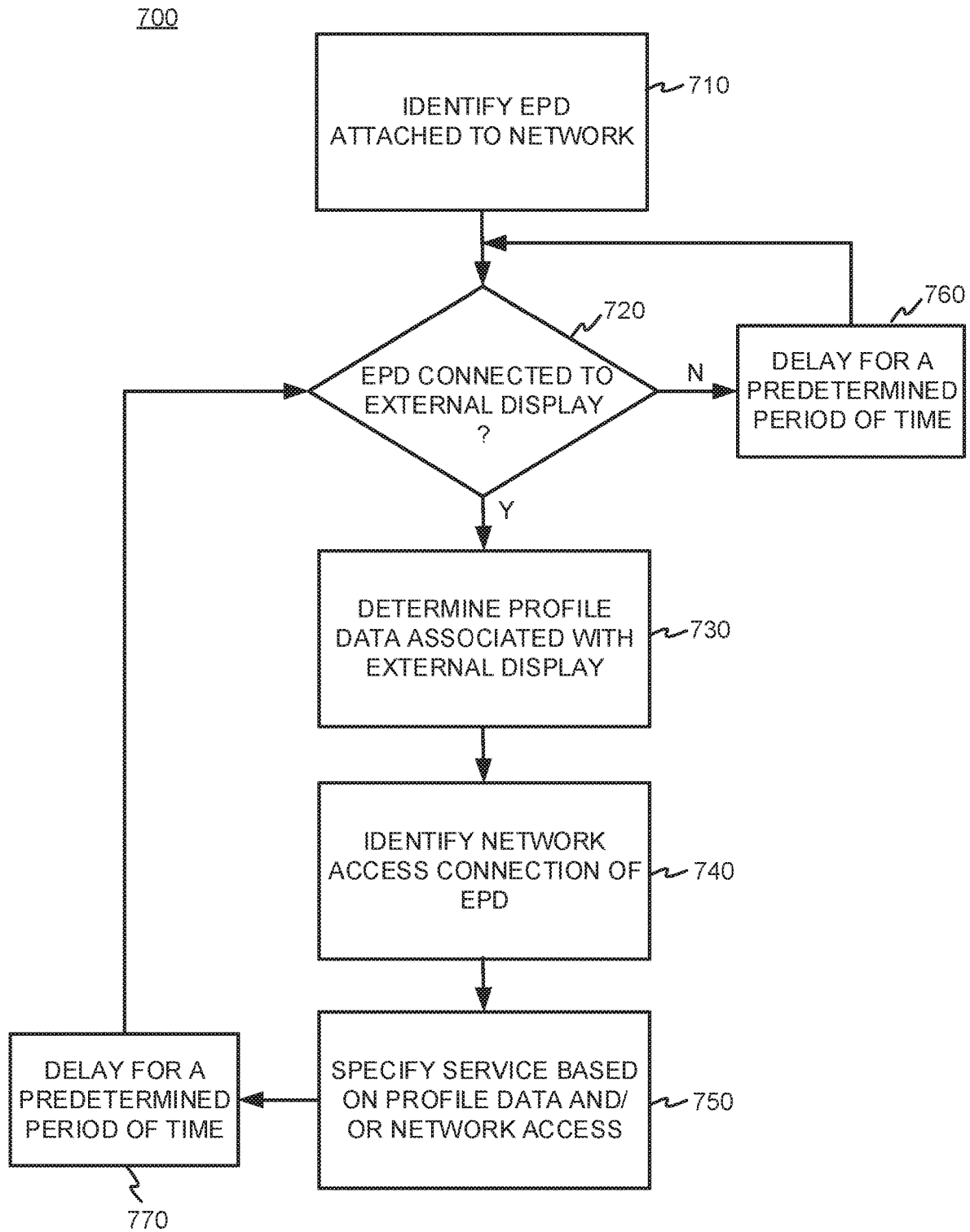
FIG. 7 is a flow chart showing an exemplary process for specifying service to an endpoint device based on profile data and/or network access.

FIG. 7 is a flow chart showing an exemplary process 700 for specifying a policy to establish service to EPD 110 based on wireless network access and/or profile data stored in repository table 600. Process 700 may be performed by any network device, such as a repository device 150, via processor 420 executing instructions stored in memory 430 and/or stored in storage device 440.

Processor 420 may initially identify that EPD 110 is attached to an access network 120 via base station 130 (Block 710). Once EPD 110 is detected on access network 120, processor 420 may determine whether EPD 110 is connected to external display 160 (Block 720). Processor 420 may use standard application programming interfaces (APIs) to interrogate EPD 110 for identifying connections to external display 160. The operating system of EPD 110 may determine if external display 160 is present, and report results of the determination to repository device 150 in response to the interrogation by processor 420. If processor 420 determines that EPD 110 is not connected to external display 160 (Block 720-N), processor 420 may set a time delay for a predetermined period of time (Block 760). Once the predetermined period of time expires, processor 420 may return control top Block 710 to re-determine whether the EPD 110 is connected to external display 160. The purpose of introducing the delay in Block 760 is so that the re-determination does not occur too often and needlessly waste processor 420 and/or network resources.

When processor 420 determines that EPD 110 is connected to external display 160 (Block 720-Y), processor 420 may determine or identify profile data associated with external display 160 (Block 730). The profile data may be obtained from repository table 600 if stored therein (e.g., contained in storage device 440 or an external storage device (not shown)). For example, in an embodiment, processor 420 may determine whether a record for external display 160 associated with EPD 110 exits in repository table 600, and then read the profile data from repository table 600. The profile data may include information regarding a display size, a display resolution, a window mode, an aspect mode, and/or an interface connecting EPD 110 and external display 160, as described above with respect to FIG. 6. The profile data may also include information regarding an endpoint device profile, which may include a static device and/or a dynamic device, as also illustrated in repository table 600.

However, if profile data is not stored in repository table 600 for the particular EP 110, processor 420 may interrogate EPD 110 to determine profile data. Details of determining profile data in Block 730 are described below in relation to FIG. 8.

Once processor 420 determines or identifies profile data of external display 160, processor 420 may then identify the connection that provides network access to EPD 110 (Block 740). In an embodiment, identifying the connection may include determining a wireless standard for access network 120 associated with a wireless connection of EPD 110. The wireless standard may include long term evolution (LTE), LTE Advanced, and/or 5G New Radio (NR).

Processor 420 may then specify or recommend a service based on the profile data and/or the access connection identified (Block 750). For example, in an LTE-based access network 120, repository device 150 may specify a service by designating a QoS class identifier (QCI) as the criteria for communicating the level of service when making a request to access network 120 (e.g., send request to PCRF 290). Access network 120 (e.g., PCRF 290) may then determine what network resources are available, and inform repository device 150 and/or EPD 110 of the level of service granted. In another example, in an 5G-based access network 120, repository device 150 may specify a service by designating a QFI as the criteria for communicating the level of service when making a request to access network 120 (e.g., send request to PCF 354). Access network (e.g., PCF 354) may then determine what network resources are available, and inform repository device 150 and/or EPD 110 of the level of service granted.

The specified service may automatically alter the bandwidth, latency, QoS, etc., based on, for example, the size and/or resolution of external display 160. For example, larger, higher resolution external displays 160 would merit more bandwidth, while smaller, lower resolution external displays 160 would require less bandwidth. The specified service may be based on the bandwidth capabilities of the wireless standard used by access network 120. For example, if the wireless channel between EPD 110 and base station 130 is based on the LTE standard, then the specified service may be more likely to have a reduced bandwidth depending upon network resources. However, if the wireless channel between EPD 110 and base station 130 is based on the 5G standard, then the specified service may be more likely to have an increased bandwidth, depending upon network resources.

Further referring to FIG. 7, once the level of service is established by access network 120, processor 420 may then set a time delay for a predetermined period of time. Once the predetermined period of time expires, processor 420 may return control to Block 720 to re-determine whether the EPD 110 is connected to external display 160. Re-executing the logic in Blocks 720-750 in periodic manner may account for any changes in the status of the connection and/or state of EPD 110 and/or external display 160. For example, if the external display 160 is disconnected, then the level of service may be automatically adjusted to accommodate a smaller screen integral to EPD 110 (e.g., on a mobile device). Alternatively, if the wireless connection between access network 120 and EPD 110 is upgraded from LTE to 5G, a higher level of service may be specified in response to re-executing logic in Blocks 720-750. The time delay is introduced in Block 770 so the re-execution of the logic in Blocks 720-750 does not occur unnecessarily frequently so as to waste resources of processor 710 and/or network resources.

Figure 8:
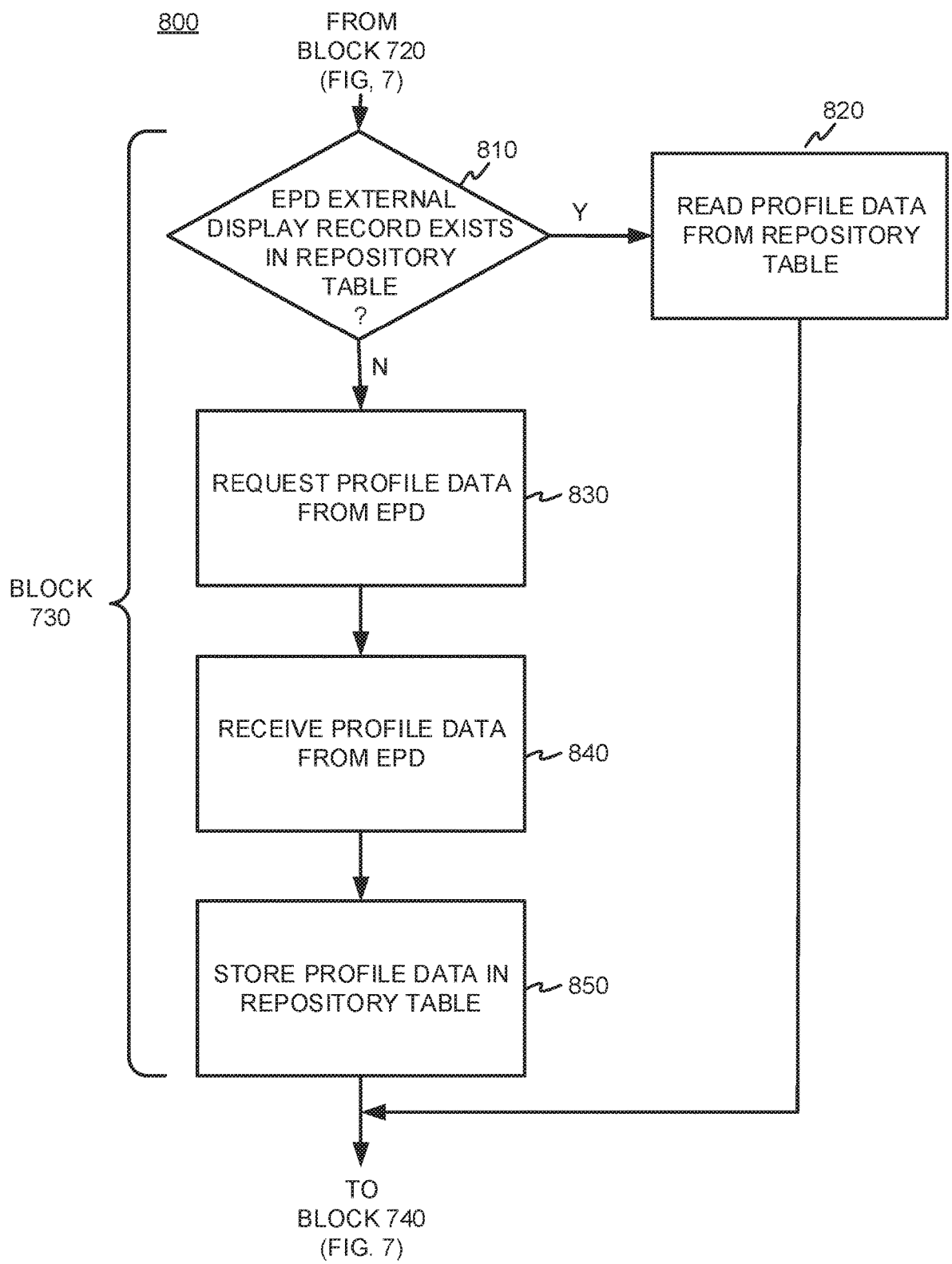
FIG. 8 is a flow chart showing an exemplary process for determining profile data associated with an external display.

FIG. 8 is a flow chart showing an exemplary process 800 for obtaining profile data when repository device 150 lacks profile data associated with EPD 110. Process 800 may be included in Block 730 of process 700. Process 800 may be performed by repository device 150 via processor 420 executing instructions stored in memory 430 and/or stored in storage device 440. Referring to FIG. 8, processor 420 may check whether a record associating EPD 110 with external display 160 exists in repository table 600 (Block 810). If a record exists in repository table 600 regarding a particular EPD 110, processor 420 may read profile data from repository table 600 (Block 820) and return control to Block 740 in process 700.

Alternatively, if processor 420 determines that a record associating EPD 110 with external display 160 does not exist in repository table 600 (Block 810-N), processor 420 may send a request to EPD 110 to report the profile data associated with external display 160 that is connected to EPD 110 (Block 830). Processor 420 may then receive, from EPD 110, the profile data which may be reported by the operating system of EPD 110 (Block 840). Processor 420 may then store the received profile data within the repository table 600 associated with EPD 110 in the repository table 600 of repository device 150 (Block 850).

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 7-8, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   collecting, at a repository device, profile data for one or more external displays associated with an endpoint device that is attached via a network access connection of a radio access network (RAN) to a network, for access to an application service for a data session, wherein the profile data is transmitted to the repository device at least one of during or after an establishment of the data session;
   determining, at the repository device, that the endpoint device is connected to an external display, of the one or more external displays, to present content associated with the application service;
   determining, at the repository device, the profile data associated with the external display, wherein the profile data includes first information identifying a type of connection interface connecting the endpoint device and the external display;
   specifying, by the repository device to the RAN, a level of the application service based on the profile data, the network access connection, and the identified type of connection interface, wherein the specifying includes designating a quality of service (QoS) class identifier (QCI) as criteria corresponding to the specified level of the application service;
   requesting, by the repository device, the specified level of the application service;
   determining, by the repository device during the data session, a change to the network access connection; and
   re-specifying, by the repository device to the RAN, the level of the application service based on the profile data, the change to the network access connection, and the identified type of connection interface, wherein the re-specifying includes designating a QoS flow identity (QFI) as criteria corresponding to the re-specified level of the application service.

2. The method of claim 1, wherein determining the profile data associated with the external display comprises:
   determining whether a record for the external display associated with the endpoint device exists; and
   reading the profile data in response to determining the record exists for the external display.

3. The method of claim 2, wherein in response to determining that the record for the external display does not exist, the method further comprises:
   sending a request to the endpoint device to report the profile data associated with the external display that is connected to the endpoint device;
   receiving, from the endpoint device, the profile data; and
   storing, at the repository device, the received profile data.

4. The method of claim 1, wherein the profile data includes an aspect mode in which the external display is configured to present the content.

5. The method of claim 1, wherein the profile data comprises second information regarding a display size, a display resolution, and a window mode in which the external display is configured to present the content.

6. The method of claim 1, wherein the profile data comprises second information regarding whether the endpoint device is a stationary device or a dynamic device,
   wherein, when the endpoint device is a stationary device, the identified type of connection interface comprises a wireline connection, and
   wherein, when the endpoint device is a dynamic device, the identified type of connection interface comprises a wireless connection.

7. The method of claim 1,
   wherein the re-specified level of the application service is a higher level of service than the specified level of the application service.

8. A network device, comprising:
   a network interface;
   a memory configured to store instructions; and a processor coupled to the network interface and the memory, wherein the processor is configured to execute the instructions stored in the memory to:
  collect profile data for one or more external displays associated with an endpoint device that is attached via a network access connection of a radio access network (RAN) to a network for access to an application service for a data session, wherein the profile data is transmitted to the network device at least one of during or after an establishment of the data session,
  determine that the endpoint device is connected to an external display, of the one or more external displays, to present content associated with the application service,
  determine the profile data associated with the external display, wherein the profile data includes first information identifying a type of connection interface connecting the endpoint device and the external display,
  specify, to the RAN, a level of the application service based on the profile data the network access connection, and the identified type of connection interface, wherein the specifying includes designating a quality of service (QoS) class identifier (QCI) as criteria corresponding to the specified level of the application service,
  request the specified level of the application service,
  determine, during the data session, a change to the network access connection, and
  re-specify, to the RAN, the level of the application service based on the profile data, the change to the network connection, and the identified type of connection interface, wherein the re-specifying includes designating a QoS flow identity (QFI) as criteria corresponding to the re-specified level of the application service.

9. The network device of claim 8, wherein the instructions to determine the profile data associated with the external display cause the processor to:
  determine whether a record for the external display associated with the endpoint device exists; and
  read the profile data in response to determining the record exists for the external display.

10. The network device of claim 9, wherein in response to the processor determining that the record for the external display does not exist, instructions further cause the processor to:
  send a request to the endpoint device to report the profile data associated with the external display that is connected to the endpoint device;
  receive, from the endpoint device, the profile data; and
  store the received profile data.

11. The network device of claim 8, wherein the profile data further includes an aspect mode in which the external display is configured to present the content.

12. The network device of claim 8, wherein the profile data comprises second information regarding a display size, a display resolution, and a window mode in which the external display is configured to present the content.

13. The network device of claim 8, wherein the profile data comprises second information regarding whether the endpoint device is a stationary device or a dynamic device,
  wherein, when the endpoint device is a stationary device, the identified type of connection interface comprises a wireline connection, and
  wherein, when the endpoint device is a dynamic device, the identified type of connection interface comprises a wireless connection.

14. The network device of claim 8, wherein the re-specified level of the application service is a higher level of service than the specified level of the application service.

15. A non-transitory computer-readable medium comprising instructions, which, when executed a processor, cause the processor to:
  collect profile data for one or more external displays associated with an endpoint device that is attached via a network access connection of a radio access network (RAN) to a network access to an application service for a data session, wherein the profile data is reported from the endpoint device at least one of during or after an establishment of the data session,
  determine that the endpoint device is connected to an external display, of the one or more external displays, to present content associated with the application service,
  determine the profile data associated with the external display, wherein the profile data includes first information identifying a type of connection interface connecting the endpoint device and the external display,
  specify, to the RAN, a level of the application service based on the profile data, the network access connection, and the identified type of connection interface, wherein the specifying includes designating a quality of service (QoS) class identifier (QCI) as criteria corresponding to the specified level of the application service,
  request the specified level of the application service,
  determine, during the data session, a change to the network access connection, and
  re-specify, to the RAN, the level of the application service based on the profile data, the change to the network access connection, and the identified type of connection interface, wherein the re-specifying includes designating a QoS flow identity (QFI) as criteria corresponding to the re-specified level of the application service.

16. The non-transitory computer-readable medium of claim 15, wherein the instructions to determine the profile data associated with the external display cause the processor to:
  determine whether a record for the external display associated with the endpoint device exists; and
  read the profile data in response to determining the record exists for the external display.

17. The non-transitory computer-readable medium of claim 16, wherein in response to the processor determining that the record for the external display does not exist, the instructions further cause the processor to:
  send a request to the endpoint device to report the profile data associated with the external display that is connected to the endpoint device;
  receive, from the endpoint device, the profile data; and
  store the received profile data.

18. The non-transitory computer-readable medium of claim 15, wherein the profile data further includes an aspect mode in which the external display is configured to present the content.

19. The non-transitory computer-readable medium of claim 15, wherein the profile data comprises second information regarding a display size, a display resolution, and a window mode in which the external display is configured to present the content, wherein, when the endpoint device is a stationary device, the identified type of connection interface comprises a wireline connection, and wherein, when the endpoint device is a dynamic device, the identified type of connection interface comprises a wireless connection.

20. The non-transitory computer-readable medium of claim 15, wherein the profile data comprises second information regarding whether the endpoint device is a stationary device or a dynamic device.

* * * * *